(12) United States Patent
Schwartz

(10) Patent No.: US 6,224,206 B1
(45) Date of Patent: May 1, 2001

(54) FASHION EYEGLASSES AND SUNGLASSES

(76) Inventor: Robert E. Schwartz, 24 Bay Ave., Sea Cliff, NY (US) 11579

( * ) Notice: Subject to any disclaimer, the term of this patent is extended or adjusted under 35 U.S.C. 154(b) by 0 days.

(21) Appl. No.: 09/499,808

(22) Filed: Feb. 8, 2000

(51) Int. Cl.$^7$ .................................................. G02C 7/10
(52) U.S. Cl. ................................................. 351/44; 351/41
(58) Field of Search ..................... 351/41, 44, 51, 351/159; 359/838, 867

(56) References Cited

U.S. PATENT DOCUMENTS

| | | | |
|---|---|---|---|
| 990,303 | * 4/1911 | Shreiner | 351/44 |
| 4,155,626 | * 5/1979 | Grech | 351/41 |
| 4,256,386 | 3/1981 | Herbert | 351/43 |
| 4,315,665 | * 2/1982 | Haines | 351/44 |
| 4,715,702 | * 12/1987 | Dillon | 351/44 |
| 4,826,307 | 5/1989 | Pandolfino, Jr. | 351/41 |

FOREIGN PATENT DOCUMENTS

| | | |
|---|---|---|
| 212572 | 8/1909 | (DE) . |
| 1154360 | 6/1969 | (GB) . |

OTHER PUBLICATIONS

"The Optician" vol. 131, No. 340, Jul. 13, 1956, pp. 658–659, Plastic Aspherical Spectacle Magnifiers for Subnormal Vision, The New Igard Hyperoculars.

Review of Optometry, vol. XC, No. 22, Nov. 15, 1953, pp. 35–40., An Improved System of Wide–Angle Magnifying Spectacles Edwin W. Bechtold, Optometry Laboratory, Columbia University.

* cited by examiner

*Primary Examiner*—Huy Mai
(74) *Attorney, Agent, or Firm*—Amster, Rothstein & Ebenstein

(57) ABSTRACT

Fashion eyeglasses include a frame for removably securing at least one lens to the head of a wearer, and at least one lens secured to the frame for positioning each lens in front of a respective eye of a wearer. Each lens has a concave external surface remote from the wearer and a convex internal surface adjacent the wearer. Preferably, the center of each lens is adjacent a respective eye of the wearer, and the edge of each lens is remote from the respective eye of the wearer. The eyeglasses may be sunglasses wherein each lens is reflectively mirrored on its concave external surface, thereby to produce to a viewer a magnified and inverted reflection of the viewer.

13 Claims, 1 Drawing Sheet

FASHION EYEGLASSES AND SUNGLASSES

BACKGROUND OF THE INVENTION

The present invention relates to fashion eyeglasses, and more particularly to fashion reflective sunglasses.

Reflective sunglasses which contain mirrored lenses to present to a viewer a reduced and upright image of the viewer are well known and were considered to be quite fashionable in certain circles. However, over time, such sunglasses have become passé and lost their "fashion" touch because they are so well known and conventional in the sunglass art. Thus the need remains for sunglasses which will function differently than the conventional reflective sunglasses (relative to a viewer) and thus hopefully become the new fashion.

Accordingly, it is an object of the present invention to provide fashion sunglasses which present to a viewer a magnified and inverted image of the viewer.

Another object is to provide such fashion sunglasses wherein each lens has a concave external surface remote from the wearer and a convex internal surface adjacent the wearer.

A further object is to provide such fashion sunglasses which are simple and economical to manufacture, use and maintain.

SUMMARY OF THE INVENTION

It has now been found that the above and related objects of the present invention are obtained in fashion eyeglasses comprising a frame for removably securing at least one lens to the head of a wearer, and at least one lens secured to the frame for positioning each lens in front of an eye of a wearer, each lens having a concave external surface remote from the respective eye of the wearer and a convex internal surface adjacent the wearer.

Preferably the center of each lens is adjacent a respective eye of the wearer, and the edge of each lens is remote from the respective eye of the wearer. Optionally, in each lens the concave external surface and the convex internal surface are substantially parallel so that the lens is non-refractive, or the concave external surface and the convex internal surface are not substantially parallel so that the lens is refractive.

The present invention also encompasses fashion reflective sunglasses wherein each lens is reflectively mirrored on its concave external surface, thereby to produce to a viewer a magnified and inverted reflection of the viewer. Preferably, each lens is configured, dimensioned and mirrored to present to a viewer a magnified and inverted image of the viewer.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENT

Figure 1:
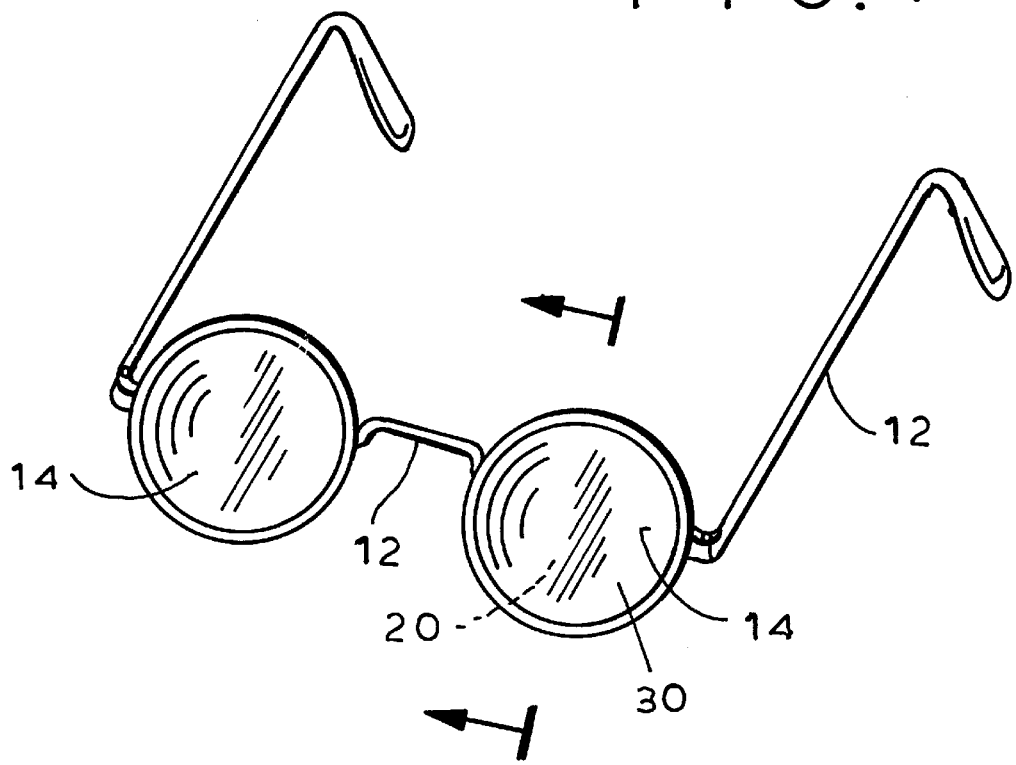
FIG. 1 is an isometric view of fashion sunglasses according to the present invention.

Referring now to the drawing, and in particular to FIG. 1 thereof, therein illustrated are fashion reflective sunglasses according to the present invention, generally designated by the reference numeral 10. The sunglasses comprise a conventional frame, generally designated 12, for removably securing at least one lens 14 (as shown, two lenses 14) to the head of the wearer, and at least one lens 14 secured to frame 12 for positioning such lens in front of a respective eye of the head of the wearer. Typically there will be two lenses, each disposed in front of a respective eye of the wearer, although in one embodiment there may be simply a large lens disposed in front of both eyes of the wearer.

Each lens has a concave external surface 20 remote from the wearer and a convex internal surface 22 adjacent the wearer. In other words, the center 24 of each lens 14 is adjacent to the respective eye of the wearer, and the edge 26 of each lens 14 is remote from the respective eye of the wearer.

Figure 2:
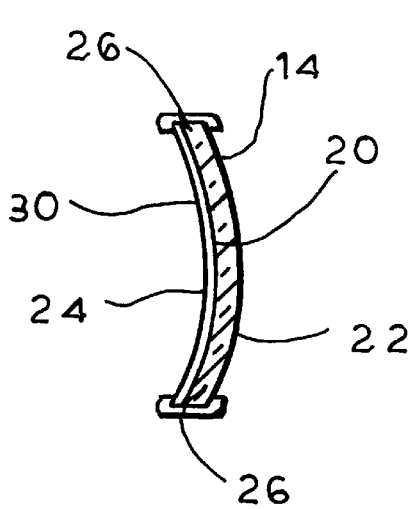
FIG. 2 is a sectional view taken along the line 2—2 of FIG. 1, showing a non-refractive lens.
Figure 3:
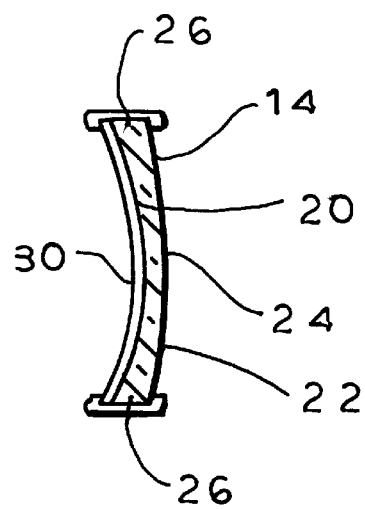
FIG. 3 is a view similar to FIG. 2, but showing a refractive lens.

As illustrated in FIG. 2, the concave external surface 20 and convex internal surface 22 of at least one lens are preferably substantially parallel so that the lens is non-refractive. Alternatively, as illustrated in FIG. 3, the concave external surface 20 and the convex internal surface 22 are preferably not substantially parallel so that the lens is refractive. Whether the refractive or non-refractive lens is preferred will be determined by the eyesight of the wearer. The non-refractive lens does not affect the eyesight of the wearer, while the refractive lens serves as a prescription lens.

While the above described eyeglasses 10 present an unusual lens configuration which—by itself and without a reflective function—acts as a fashion statement, preferably the eye glasses are in the nature of reflective sunglasses. In this embodiment, each lens 14 is covered with a reflecting or reflective mirror coating 30 on its concave external surface 20. As a result, the lens 14 produces to a viewer a reflection of the viewer which is both magnified and inverted (that is, enlarged and upside down). This magnified and inverted reflection is novel and will undoubtedly become fashionable (relative to the reduced and upright reflection of conventional reflective sunglasses). The reflective surface 30 does not affect the vision of the wearer except in the common nature of sunglasses—that is, to reduce somewhat the vision of the wearer, as well as the brightness or glare of the view—so long as it is disposed on the concave external surface 20 rather than the convex internal surface 22. If the reflective surface is on the convex internal surface 22, it may impair the vision of the wearer by reflecting light and glare into the wearer's eyes.

Thus the present invention preferably comprises sunglasses having a frame 12 for a pair of lenses 14, each lens 14 being configured, dimensioned and mirrored to present to a viewer a magnified and inverted image of the viewer.

To summarize, the present invention provides fashion reflective sunglasses which present to a viewer a magnified and inverted image of the viewer, each lens having a concave external surface remote from the wearer and a convex internal surface adjacent the wearer. The fashion sunglasses are simple and economical to manufacture, use and maintain while making a clear "fashion statement" due to their unusual nature.

Now that the preferred embodiments of the present invention have been shown and described in detail, various modifications and improvements thereon will be readily apparent to those skilled in the art. Accordingly, the spirit and scope of the present invention is to be construed broadly and limited only by the appended claims, and not by the foregoing specification.

I claim:

1. Fashion eyeglasses comprising:
   (A) a frame for removably securing a single pair of lenses to the head of a wearer; and
   (B) a single pair of lenses secured to said frame for positioning each said lens in front of a respective eye of a wearer, each said lens having a concave external surface remote from the wearer and a convex internal surface adjacent the wearer.

2. The eyeglasses of claim 1 wherein the center of each said lens is adjacent a respective eye of the wearer, and the edge of each said lens is remote from the respective eye of the wearer.

3. The eyeglasses of claim 1 wherein, for at least one of said lenses, said concave external surface and said convex internal surface are substantially parallel.

4. The eyeglasses of claim 1 wherein at least one of said lenses is non-refractive.

5. The eyeglasses of claim 1 wherein, for at least one of said lenses, said concave external surface and said convex internal surface are not substantially parallel.

6. The eyeglasses of claim 1 wherein at least one of said lenses is refractive.

7. Reflective fashion sunglasses comprising:
   (A) a frame for removably securing at least one lens to the head of a wearer; and
   (B) at least one lens secured to said frame for positioning each said lens in front of a respective eye of a wearer, each said lens having a concave external surface remote from the wearer and a convex internal surface adjacent the wearer;
   each said lens being reflectively mirrored on its concave external surface, thereby to produce to a viewer a magnified and inverted reflection of the viewer.

8. The sunglasses of claim 7 wherein the center of each said lens is adjacent a respective eye of the wearer, and the edge of each said lens is remote from the respective eye of the wearer.

9. The sunglasses of claim 7 wherein, for at least one said lens, said concave external surface and said convex internal surface are substantially parallel.

10. The sunglasses of claim 7 wherein at least one said lens is non-refractive.

11. The sunglasses of claim 7 wherein, for at least one said lens, said concave external surface and said convex internal surface are not substantially parallel.

12. The sunglasses of claim 7 wherein at least one said lens is refractive.

13. Fashion sunglasses comprising a frame and a pair of lenses, each said lens being configured, dimensioned and mirrored to present to a viewer a magnified and inverted image of the viewer.

* * * * *